United States Patent [19]
Balkcom

[11] Patent Number: 5,461,818
[45] Date of Patent: * Oct. 31, 1995

[54] SPINNING ROD ASSEMBLY

[76] Inventor: Charles W. Balkcom, Rte. 4, Box 1125, Macon, Ga. 31201

[ * ] Notice: The portion of the term of this patent subsequent to Jun. 7, 2011, has been disclaimed.

[21] Appl. No.: 254,254

[22] Filed: Jun. 6, 1994

Related U.S. Application Data

[63] Continuation of Ser. No. 716,741, Jun. 14, 1991, Pat. No. 5,317,829, which is a continuation of Ser. No. 452,104, Dec. 18, 1989, abandoned.

[51] Int. Cl.$^6$ .................................................. A01K 97/00
[52] U.S. Cl. ........................................................ 43/23; 43/25
[58] Field of Search .................................... 43/22, 23, 25

[56] References Cited

U.S. PATENT DOCUMENTS

| | | | |
|---|---|---|---|
| 2,116,158 | 5/1938 | Pontis . | |
| 2,482,192 | 9/1949 | MacDonald | 43/25 |
| 2,826,852 | 3/1958 | Wardrip | 43/22 |
| 3,295,244 | 1/1967 | Kuntze | 43/22 |
| 3,410,017 | 11/1968 | Wilson | 43/22 |
| 3,616,565 | 11/1971 | Jung | 43/22 |
| 3,973,348 | 8/1976 | Shell | 43/23 |
| 4,519,159 | 5/1985 | Fazio | 43/25 |
| 4,648,196 | 4/1987 | Moody | 43/23 |
| 4,697,377 | 10/1987 | Martin | 43/23 |
| 4,793,087 | 12/1988 | McGee | 43/23 |
| 4,830,306 | 5/1989 | Tsunoda et al. | 242/84.2 |
| 4,850,130 | 7/1989 | Childre et al. | 43/23 |

FOREIGN PATENT DOCUMENTS

| | | | |
|---|---|---|---|
| 3295244 | 1/1967 | Germany | 43/22 |
| 3616565 | 11/1971 | Germany | 43/22 |
| 4830306 | 5/1989 | Japan | 242/84.2 |

Primary Examiner—Kurt Rowan
Attorney, Agent, or Firm—Hopkins & Thomas

[57] ABSTRACT

A spinning rod assembly comprises an elongated rod having a handle from which a reel shank laterally extends. A pair of finger supports extend from the handle and straddle the reel shank. The finger supports are configured to bear against the fingers of an angler grasping the rod as the angler casts and retrieves to distribute attendant pressure among the angler's fingers and relieve pain and discomfort previously associated with casting and retrieving.

3 Claims, 3 Drawing Sheets

SPINNING ROD ASSEMBLY

This application is a continuation of U.S. patent application Ser. No. 07/716,741 filed Jun. 14, 1991, which was a file wrapper continuation of application Ser. No. 07/452,104 filed Dec. 18, 1989 now abandoned. Ser. No. 07/716,741 is now U.S. Pat. No. 5,317,829 issued Jun. 7, 1994.

TECHNICAL FIELD

The present invention relates to fishing and particularly to a spinning rod assembly having a handle portion adapted to improve an angler's grip and reduce the pain and discomfort of casting and retrieving.

BACKGROUND OF THE INVENTION

When casting with a spinning rod of the type having a reel suspended from the rod handle on a thin shank, an angler usually grips the handle in one hand with the reel shank extending between his second and third fingers and his thumb positioned atop the handle. The rod is then raised overhead with the line secured beneath the angler's first finger and moved rapidly through and to the end of a forward casting arc. Near the end of the arc, the line is released to propel the lure to a desired location for fishing.

An affecting such a cast, the angler must exert considerable pressure on the rod handle and reel shank with his hand and fingers. The thumb, for example, typically exerts downward and forward pressure on top of the handle while the third and fourth fingers exert upward pressure on the bottom of the handle and the back of the second finger bears against and exerts rearward pressure on the reel shank. Further, the back of the first finger tends to bear against the second finger significantly increasing the pressure exerted by the second finger on the reel shank. As a result of the second finger bearing against the reel shank, the angler commonly experiences discomfort in this finger after a few casts which can become severe pain after a prolonged period of casting. In addition, the forward momentum of the rod at the end of the casting arc tends to cause the reel shank to bear even more strongly against the back of the angler's second finger thereby increasing the pressure and causing even more pain and discomfort.

An angler can also experience discomfort while retrieving a fish. In counteracting the downward and rearward forces exerted on the rod during such retrieval, the angler typically exerts upward pressure on the handle with his first and second fingers and forward pressure on the reel shank with the front of this third finger. The forth finger also tends to bear against the third finger further increasing its pressure on the reel shank. As with casting, the pressure of the reel shank on the third finger can cause the angler great pain and discomfort after prolonged periods of fishing.

Prior attempts to relieve the just described pain and discomfort have included spinning rods with a leather strap that can be tightened about an angler's hand for improved grip, contoured reel shanks to cushion the impact of the shank on the fingers and elastic or rubber straps that fit tightly about an angler's fingers during casting and retrieving. Exemplary of such attempts are the devices disclosed in U.S. Pat. Nos. 4,419,159 of Fazio, 4,648,196 of Moody, 4,697,377 of Martin and 4,793,087 of McGee. While some of these devices have experienced limited success, they have in general fallen far short of solving the problem. Indeed, some, such as the leather strap, can even hinder an angler's ability to cast accurately by restricting movement of his hand and fingers about the rod handle.

A continuing and hitherto unsuccessfully addressed need exist, therefore, for a spinning rod assembly that can be cast and used to retrieve caught fish for prolonged periods of time without causing pain and discomfort to an angler's third and fourth fingers. It is to the provision of such a spinning rod assembly that the present invention is primarily directed.

SUMMARY OF THE INVENTION

The present invention is a spinning rod assembly having a rod with a handle and a reel suspended from the handle on a reel shank. A pair of contoured finger supports extend from the handle straddling the reel shank. When fishing, an angler grasps the rod handle with his first finger positioned in front of the forward support, his second finger captured between the forward support and the reel shank, his third finger captured between the reel shank and the rear support and his forth finger positioned behind the rear support. During casting, the rearward pressure that in the past has been exerted exclusively by the second finger on the reel shank is now exerted by the first, second and third fingers on the forward support, reel shank and rear support respectively. Similarly, when retrieving a fish, the forward pressure that previously has been exerted exclusively by the third finger on the reel shank is now exerted by the second, third and fourth fingers on the forward support, reel shank and rear support respectively.

Thus, it is seen that with the present invention pressure that previously has been exerted on the reel shank by a single finger is now distributed evenly among three of an angler's fingers thereby significantly reducing the pressure exerted by any one finger. Such reduction has been found virtually to eliminate the pain and discomfort previously experienced by anglers such that they can now fish for extended periods in comfort and enjoy their sport even more. Additional features, objects and advantages of the invention will become apparent upon review of the following description taken in conjunction with the accompanying drawings.

DETAILED DESCRIPTION

Figure 1:
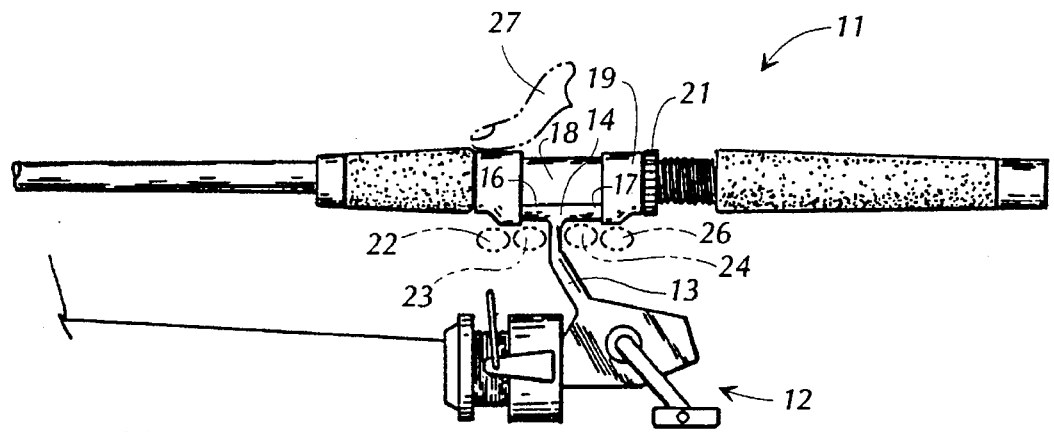
FIG. 1 is a side elevational view of the handle portion of a spinning rod assembly of conventional prior art configuration.

Referring now in detail to the drawings, in which like numerals represent like parts throughout the several views, FIG. 1 illustrates a typical prior art spinning rod assembly showing common positions of an angler's thumb and fingers in phantom line. The assembly is seen to include a handle portion 11 and a spinning reel 12 suspended therefrom on a reel shank 13. The upper end of the reel shank 13 is formed with a transversely extending mounting foot 14 that has opposed tapered end portions 16 and 17. The upper surface of the foot 14 commonly is slightly concave to conform to the curvature of the handle portion 11 when mounted thereto.

Retaining rings 18 and 19 are slidably disposed about the handle portion 11 and are configured to be slid snuggly over the opposed ends 16 and 17 of the mounting foot 14 for releasably securing the foot 14 and thus the reel to the rod handle as shown. A knurled securing ring 21 is threaded onto the handle portion 11 behind the rear retaining ring 19. This ring can be threaded forward to engage and bear against the retaining ring 19 to maintain the rings 18 and 19 in their reel mounting positions about the ends of the mounting foot 14. Common rod gripping positions of an angler's first, second, third and fourth fingers 22, 23, 24 and 26 respectively and thumb 27 are shown in phantom lines in FIG. 1. It can be seen that the rod commonly is gripped with the reel shank 13 extending between the second and third fingers and the thumb positioned atop the handle for maximum control of the spinning rod during casting and retrieving.

Figure 2:
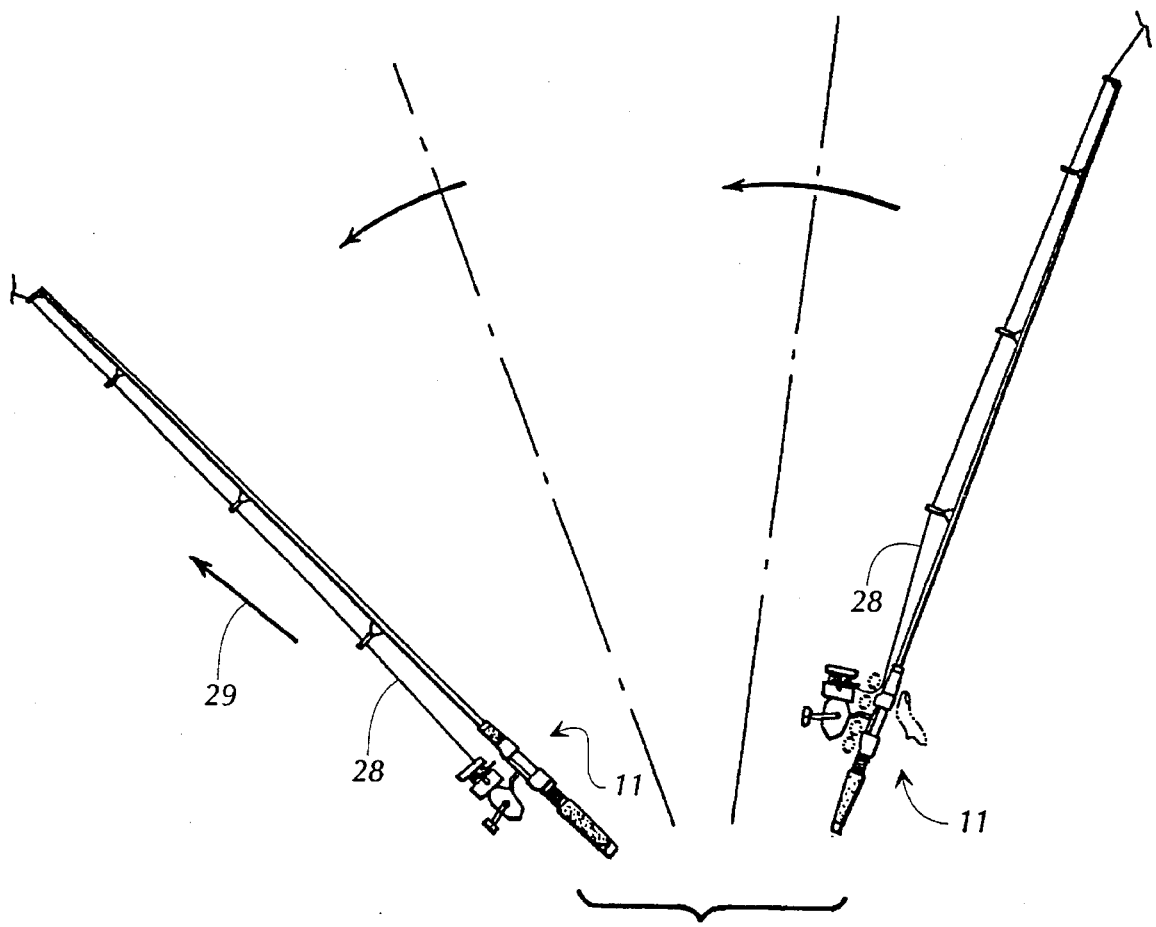
FIG. 2 is a diagrammatical illustration of the motion of a spinning rod through a forward arc during casting.

FIG. 2 illustrates motion of the spinning rod through a forward casting arc to propel a fishing lure to a desired location for fishing. For such casting, an angler typically grasps the rod handle 11 as illustrated in FIG. 1 with the fishing line 28 secured beneath his first finger as shown. The rod is then raised and moved rapidly through the forward casting arc by applying downward pressure on the top of the handle with the thumb, upward pressure on the bottom of the handle with the third and fourth fingers and considerable rearward pressure on the reel shank with the side of the second finger. Near the end of the casting arc, the line 28 is released and the forward arcuate motion of the rod abruptly arrested to propel the lure. In arresting such motion, the forward momentum of the rod (indicated at 29) causes the reel shank 13 to bear against the exert even more pressure on the angler's second finger positioned in front of the reel shank. As previously mentioned, the pressure exerted by the second finger on the reel shank and the increase of this pressure at the end of the cast causes discomfort after a short time and can cause severe pain after prolonged periods of casting. The pain can be so severe that the angler is forced to switch to a less efficient grip or discontinue his fishing altogether.

Figure 3:
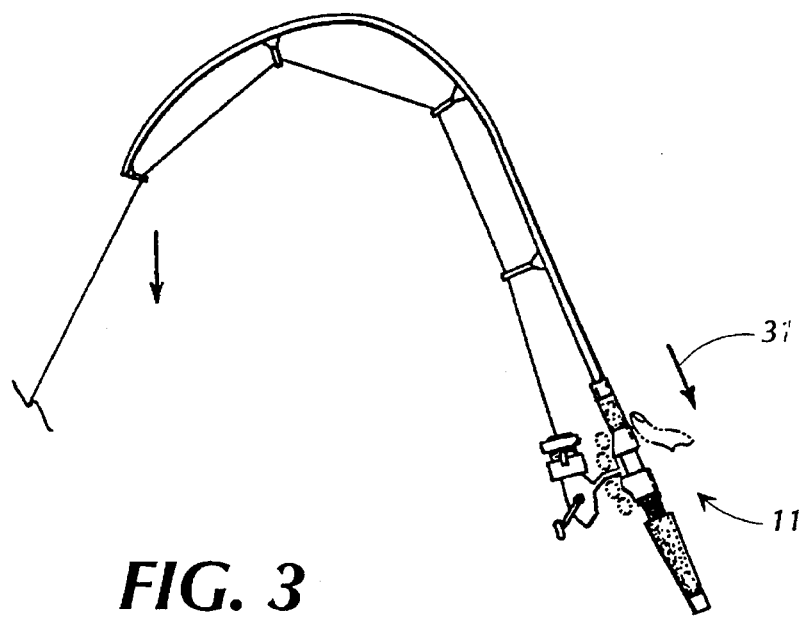
FIG. 3 is an illustration of the configuration of a typical spinning rod during fish retrieval.

FIG. 3 illustrates pressure exerted on an angler's fingers upon retrieval of fish with a spinning rod assembly of the type shown in FIG. 1. The weight of the fish generally causes the tip of the rod to bend which in turn induces a downward and rearward force on the rod handle. In addition the rod handle tends to pivot forwardly in the angler's hand. This force and pivotal tendency causes the reel shank to engage and bear with considerable pressure against the third finger positioned just behind the shank. As with casting, such pressure can cause severe pain and discomfort for an angler forcing a switched grip on discontinuance of fishing activity.

FIGS. 4 through 7 illustrate a spinning rod assembly constructed according to the present invention for relief of pain and discomfort previously associated with casting and retrieving. The assembly 30 is similar to prior art spinning rods in that it includes an elongated rod 32 having a handle portion 33. A spinning reel 34 is suspended from the handle portion 33 on a reel shank 36 that includes a transversely extending mounting foot 37 with opposed tapered end portions. A forward retaining ring 39 and a rear retaining ring 41 are slidably disposed about the handle and sized to be slid snuggly about the tapered end portions of the foot 37 for releasably securing the foot 37 and thus the spinning reel 34 to the handle 33. A securing ring 42 is threadably disposed about the handle 33 behind the rear securing ring 41 and can be threaded forward to engage and bear against the retaining ring 41 thereby securing the retaining rings 39 and 41 in position.

Retaining ring 39 includes an integrally formed depending finger support 43 and retaining ring 41 includes a similar depending finger support 44. Finger supports 43 and 44 are positioned to straddle the reel shank 36 as shown when the retaining rings 39 and 41 are in their reel securing positions about the end portions of the foot 37. A removable collar 46 extends about the handle and includes a contoured lower portion 47 that encloses most of the foot 37 and an upper portion of the reel shank 36. The finger supports 43 and 44 together with the collar lower portion 47 define contoured slots for receiving the fingers of an angler grasping the rod. Specifically, an angler grasps the rod handle with the collar lower portion 47 and reel shank 36 extending between his second and third fingers, his first finger nestled in front of the forward finger support 43 and his fourth finger nestled behind the rear finger support 44. The thumb is typically positioned atop the handle in the usual way as shown.

With the handle thus gripped, the rod can be raised and moved through the forward casting arc in the usual way to propel the lure to a desired location. In affecting the cast, the angler's thumb exerts downward pressure on the top of the handle while his third and fourth fingers exert upward pressure on the underside of the handle as usual. In addition, the first finger now exerts rearward pressure on the forward support 43, the second finger exerts rearward pressure on the collar lower portion 47 and the third finger exerts rearward pressure on the rear finger support 44. Thus, all of the rearward pressure that in the past has been exerted exclusively by the second finger on the reel shank is now exerted by and distributed among three of the angler's fingers. The pressure exerted by any one finger, therefore, is reduced by at least two thirds.

Similarly, at the end of the casting arc, the forward momentum of the rod is arrested as the rear finger support 44 bears against the third finger, the collar lower portion 47 bears against the second finger and the forward finger support 43 bears against the first finger. In this way, pressure exerted in arresting the forward motion of the rod is now also distributed among three fingers instead of being born exclusively by the second finger. This distribution of pressure and attendant reduction thereof on the second finger has been found virtually to eliminate the pain and discomfort of casting often experienced in the past. In addition, the contoured shape of the collar 47 and finger supports 43 and 44 tends to cushion the impact of exerted pressure to provide even further relief of discomfort. An angler can thus cast for extended periods without experiencing any pain or discomfort in his fingers.

Pressure is distributed in a similar way with the present invention when retrieving fish. Specifically, the rearward pressure previously exerted by the reel shank exclusively on the third finger is now distributed among three fingers as the forward finger support 43 exerts pressure on the second finger, the collar lower portion exerts pressure on the third finger and the rear finger support exerts pressure on the fourth finger. Again, this results in a reduction of pressure on any one finger by at least two thirds virtually eliminating the pain and discomfort previously experienced.

While collar 46 has been illustrated as an expedient in FIGS. 4 through 7, it will be understood that its purpose is simply to provide a contoured surface against which the angler's second and third fingers can exert pressure. Such could also be provided, if desired, by a reel shank having an upper portion configured to conform substantially to the contoured shape of the collar lower portion 47. With a shank of such configuration, an ancillary collar would obviously be unnecessary to a complete realization of the objects of the invention.

Figure 4:
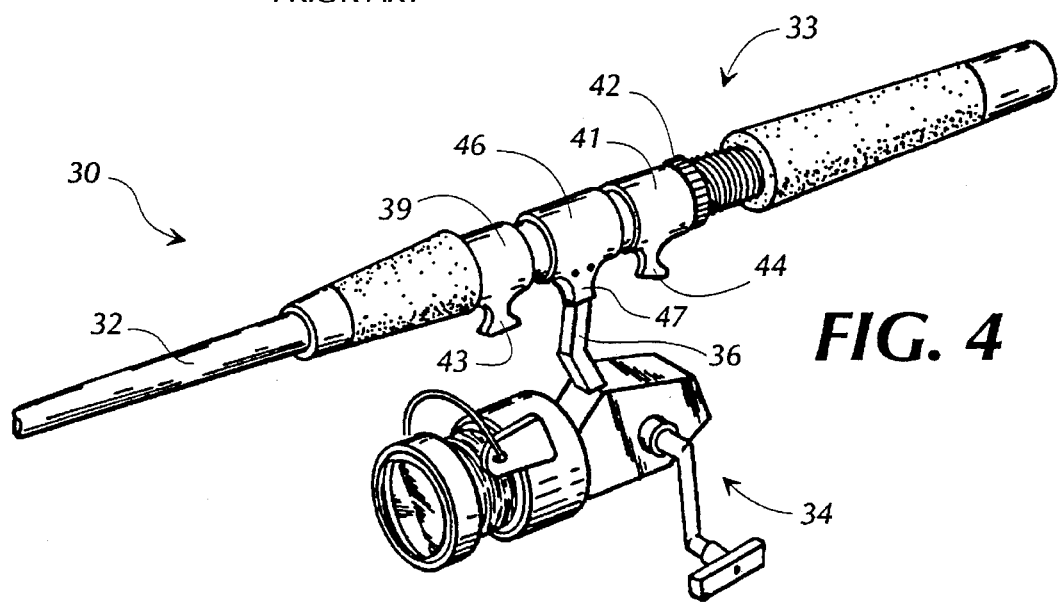
FIG. 4 is a perspective view of the handle portion of a spinning rod assembly that embodies principals of the invention in a preferred form.
Figure 5:
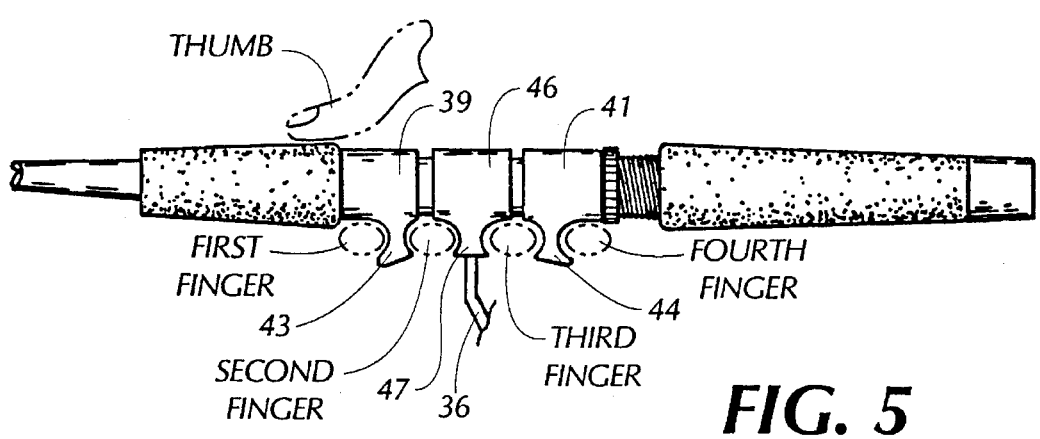
FIG. 5 is a side elevational view of the assembly of FIG. 4 showing preferred gripping positions of an angler's fingers.
Figure 6:
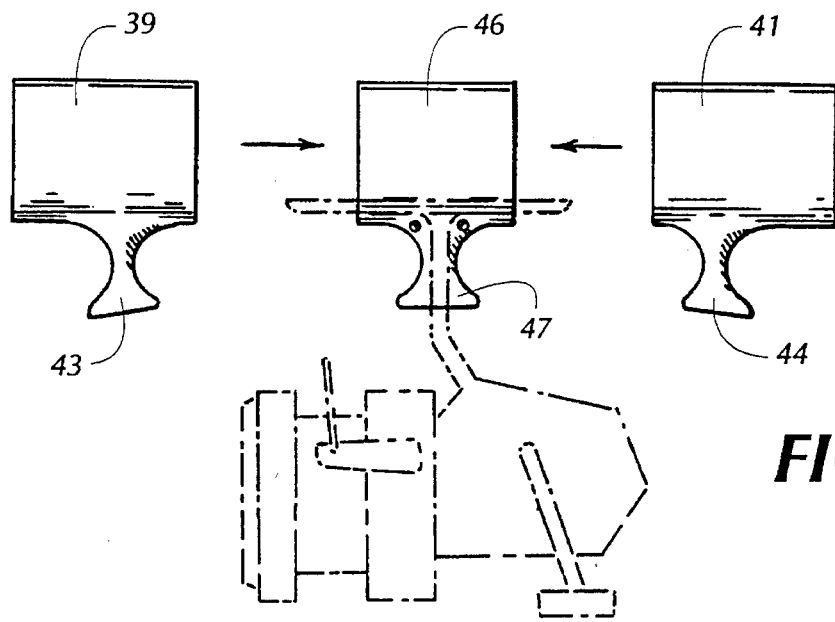
FIG. 6 illustrates the embodiment of FIG. 4 in a simplified partially exploded view.
Figure 8:
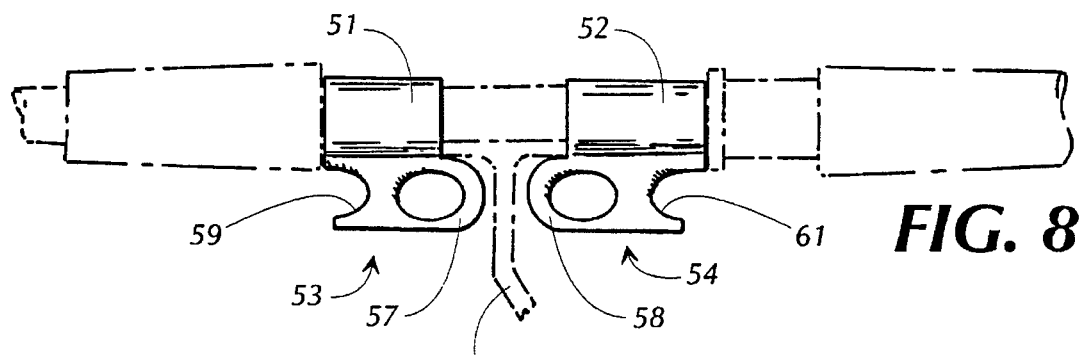
FIG. 8 is a side elevational view of a second embodiment of the invention.
Figure 7:
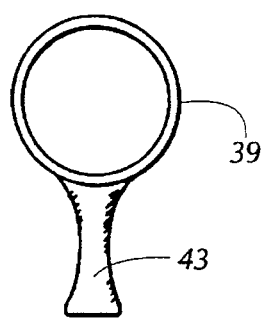
FIG. 7 is a front elevational view of a retaining ring configured according to the present invention.

FIG. 8 illustrates a second embodiment of the invention operable without the collar of FIGS. 4 through 6. Here, the retaining rings 51 and 52 are each formed with depending finger receiving members 53 and 54 that straddle and extend inwardly toward the reel shank 56. The finger receiving members 53 and 54 include confronting annular portions 57 and 58 respectively and opposed C-shaped slots 59 and 61. With this embodiment, an angler grasps the rod handle with his second and third fingers extending through the annular portions 57 and 58, his first finger nestled within forward C-shaped slot 59 and his fourth finger nestled within rear C-shaped slot 61. With the handle thus gripped, the embodiment of FIG. 8 functions as previously described to distribute pressures attendant casting and retrieving among three of the angler's fingers for relief of pain and discomfort.

Figure 9:
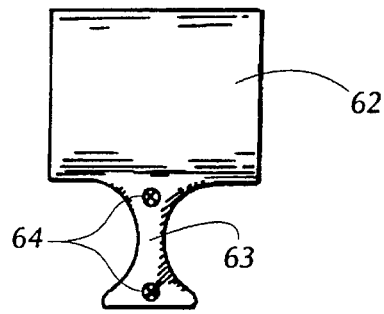
FIGS. 9 and 10 illustrate a third embodiment of the invention for conversion of existing spinning rods.
Figure 10:
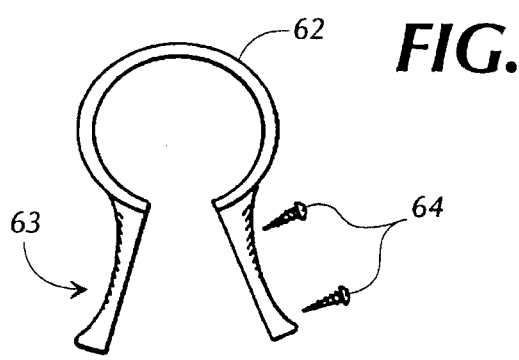

FIGS. 9 and 10 illustrate the present invention in the form of an adaptor for use with existing spinning rod assemblies of the type illustrated in FIG. 1. Here, a sleeve 62 has a depending finger support 63 and both sleeve and finger support are separable such that the sleeve can be opened up as shown in FIG. 10. When the sleeve is closed, the halves of the finger support can be secured together with screws 64. In use, the finger support is separated and the sleeve 62 spread apart. The sleeve can then be placed about the exterior of the retaining rings 18 and 19 (FIG. 1) of an existing spinning rod assembly whereupon the finger support halves are brought together and secured with screws 64. If desired, a collar 46 (FIG. 5) can also be added for improved comfort. With this embodiment, a conventional prior art spinning rod assembly can be converted conveniently to provide advantages of the present invention at an affordable cost.

The invention has been described in terms of preferred embodiments. It will be obvious to skilled artisans, however, that many additions, deletions and modifications might be made to such embodiments without departing from the spirit and scope of the invention as set forth in the claims.

I claim:

1. In a fishing rod assembly of the type having an elongated rod with a handle at one end for grasping by an angler, said handle having a top and a bottom and being adapted to receive a reel assembly for containing, paying out, and retrieving fishing line during casting and retrieving by the angler, the improvement thereof comprising a pair of finger supports projecting downwardly from said handle, each of said finger supports extending from said handle a distance at least equal to the width of an angler's finger, said finger supports being spaced apart along the length of said handle a distance sufficient to receive one of angler's finger between said finger supports when the angler grasps the fishing rod assembly by the handle for casting and retrieving, whereby one of an angler's fingers becomes captured between the finger supports when the angler grasps the spinning rod assembly loosely about the handle thereby restricting longitudinal movement of the captured finger relative to the handle to facilitate comfortable and controlled casting and to distribute longitudinal forces generated in the rod among more than one of the angler's fingers.

2. The improvement of claim 1 and wherein said at least one finger support is contoured to conform to the shape of the angler's finger to provide more comfortable support therefor.

3. The improvement of claim 2 and wherein said finger support has a forward finger bearing surface that is curved toward the rod end of said fishing rod assembly.

\* \* \* \* \*